May 12, 1953 — E. W. SPANNHAKE — 2,638,081
TWO-CYCLE SCAVENGING INTERNAL-COMBUSTION ENGINE
Filed Jan. 24, 1950 — 4 Sheets-Sheet 1
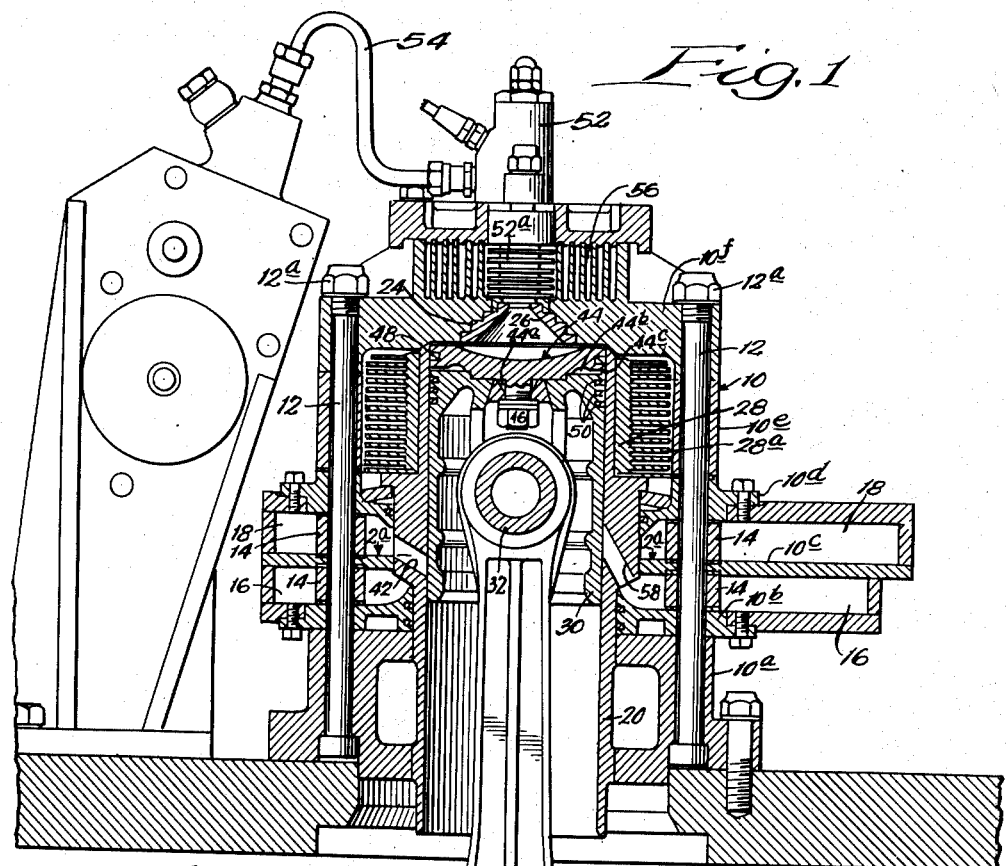
Fig. 1
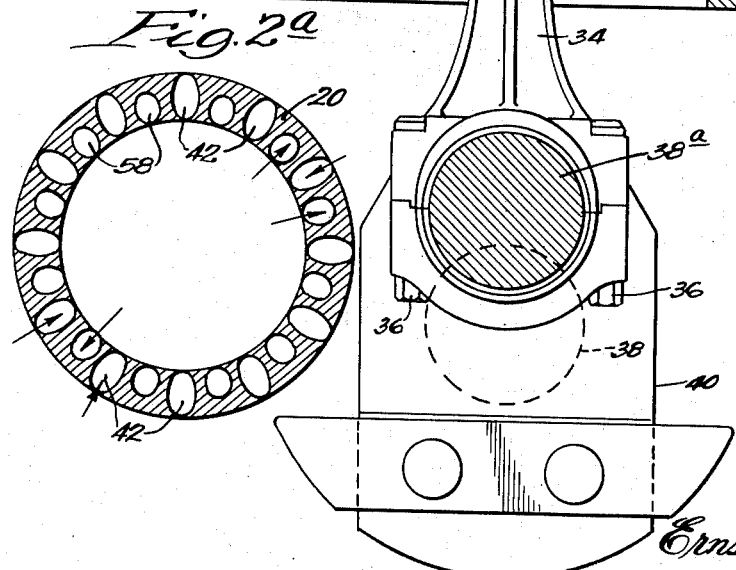
Fig. 2ᵃ
INVENTOR:
Ernst W. Spannhake,
BY Dawson, Ooms, Booth and Spangenberg,
ATTORNEYS

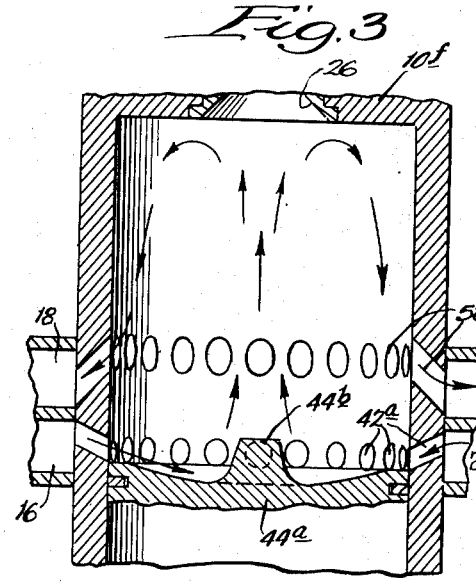
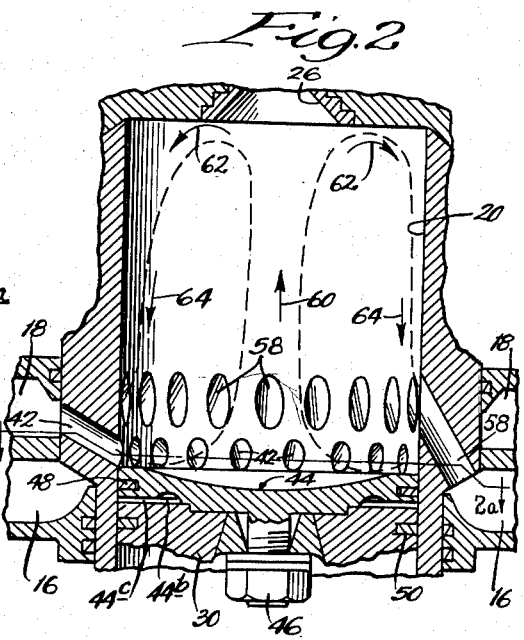
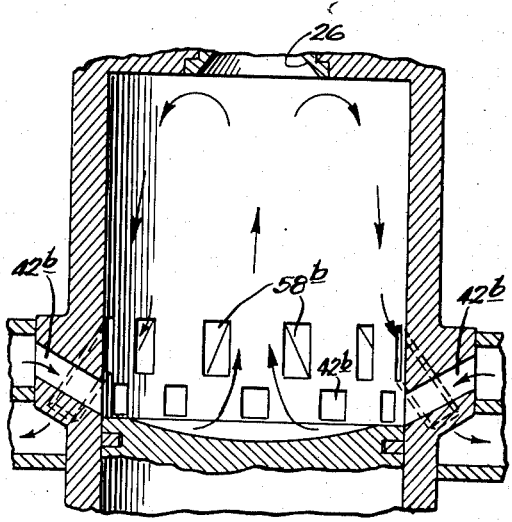
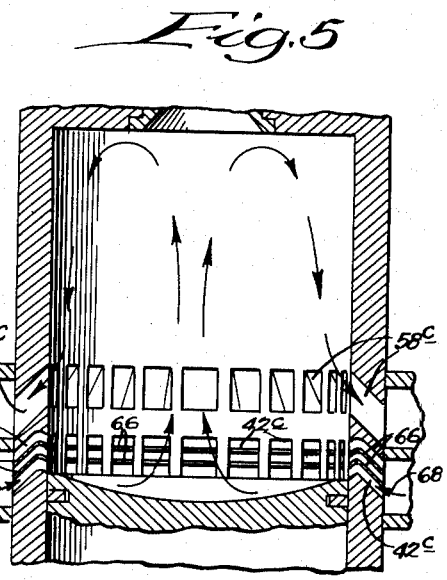

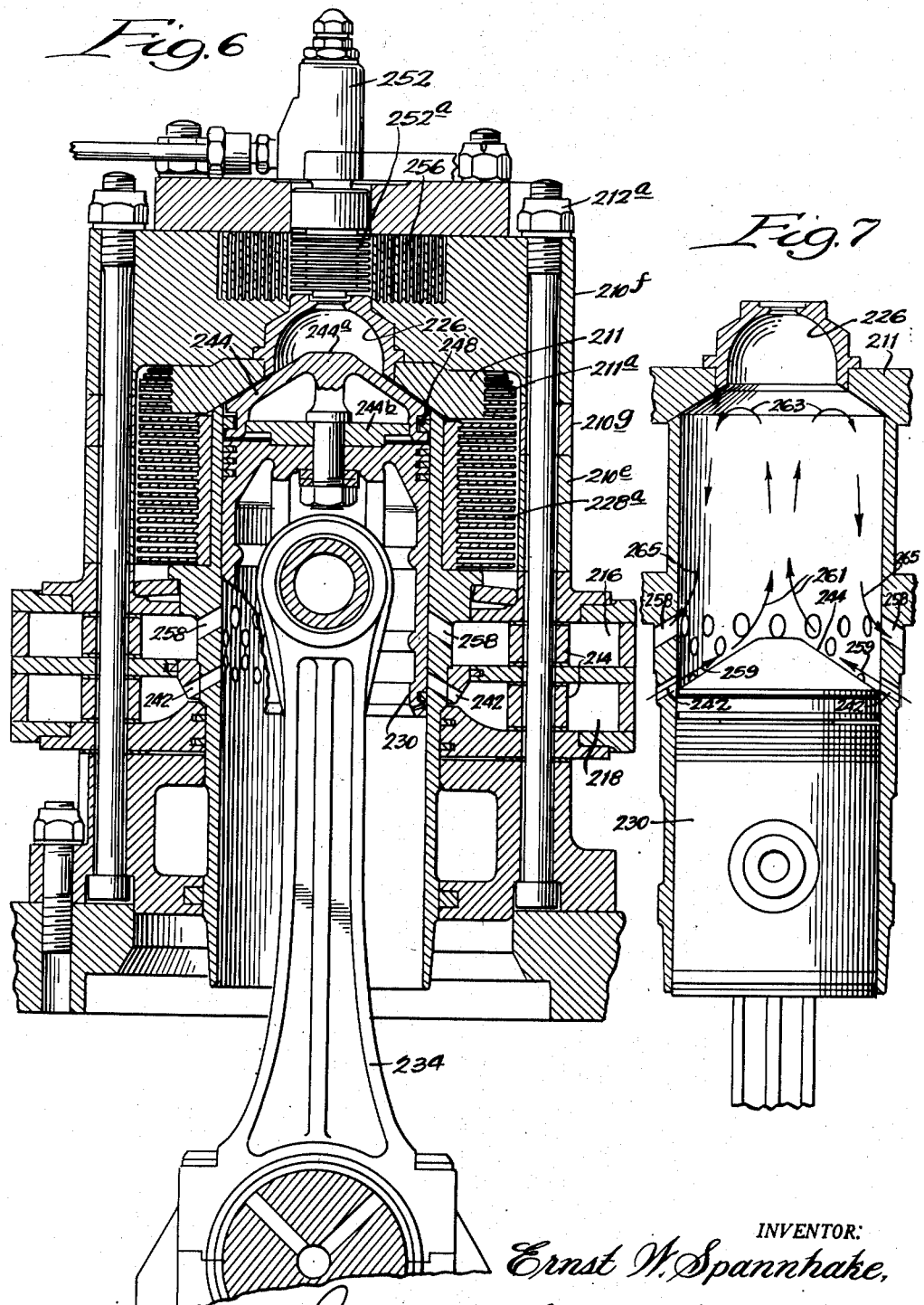

May 12, 1953  E. W. SPANNHAKE  2,638,081
TWO-CYCLE SCAVENGING INTERNAL-COMBUSTION ENGINE
Filed Jan. 24, 1950   4 Sheets-Sheet 4

INVENTOR:
Ernst W. Spannhake,
BY Dawson, Ornis, Borth and Spangenberg,
ATTORNEYS.

Patented May 12, 1953

2,638,081

UNITED STATES PATENT OFFICE 2,638,081

TWO-CYCLE SCAVENGING INTERNAL-COMBUSTION ENGINE

Ernst W. Spannhake, Park Forest, Ill., assignor to Barnes & Reinecke, Inc., Chicago, Ill., a corporation of Delaware Application January 24, 1950, Serial No. 140,285

13 Claims. (Cl. 123—65)

This invention relates to an improved internal combustion engine and cylinder therefor wherein scavenging and charging is accomplished by a new method of air flow permitting high speed port controlled two cycle engine operation with relatively low scavenging pressure and correspondingly high efficiency.

The apparatus of the present invention is characterized by utilization of the circular symmetry inherent in all practical engines to define effective flow paths for admission of air and exhaustion of products of combustion. These symmetrical flow paths efficiently carry the entering air and the products of combustion in separate streams of large cross-sectional area and relatively uniform velocity so that the undesired products of combustion are effectively replaced by the combustion-supporting air during the momentary portion of each cycle when the ports are uncovered and a minimum degree of eddy flow is created.

The structure of the present invention also utilizes exhaust port orientations that facilitate the exhaust air flow from the downwardly descending symmetrical air column created by the central symmetrical intake air flow. This exhaust port orientation greatly reduces and practically eliminates "short circuit" air flow direct from the intake ports to the exhaust ports and the attendant inefficiencies. In fact, with the conformations described herein, the throttling effect which would result from such "short circuit" flow is so great that the resultant frictional flow resistance would exceed that of the entire normal flow path through the cylinder and thereby prevent it from coming into existence.

It is therefore a general object of the present invention to provide an improved internal combustion engine and cylinder therefor wherein full advantage is taken of the symmetry of the cylinder construction to improve scavenging.

Another object of the present invention is to provide an internal combustion engine and cylinder therefor wherein the portion of operating cycle required for scavenging is minimized and the flow resistance to scavenging air through the ports is maintained at a relatively low value.

Further it is an object of the present invention to provide an improved internal combustion engine particularly suitable for high speed port controlled diesel engine operation.

Yet another object of the present invention is to provide an improved internal combustion engine with efficient scavenging wherein the axial length of the space occupied by the intake and exhaust ports is minimized.

Still another object of the present invention is to provide an improved internal combustion engine piston adapted to direct the intake gases upwardly and at the same time minimize eddy flow of the same.

Another object of the present invention is to provide an improved internal combustion engine and cylinder construction therefor wherein the intake air flow exerts maximum cooling effect on the piston.

The novel features which I believe to be characteristic of my invention are set forth with particularity in the appended claims. My invention itself, however, both as to its organization and mode of operation, together with further objects and advantages thereof, may best be understood by reference to the following description taken in conjunction with the accompanying drawings, in which:

Figure 1 is an axial cross-sectional view through the cylinder of a complete diesel engine constructed in accordance with the principles of the present invention;

Figure 2 is a fragmentary enlarged portion of Figure 1 showing in detail the air intake and exhaust ports;

Figure 2a is a fragmentary reduced cross-sectional view through axis 2a—2a, Figure 2;

Figure 8:
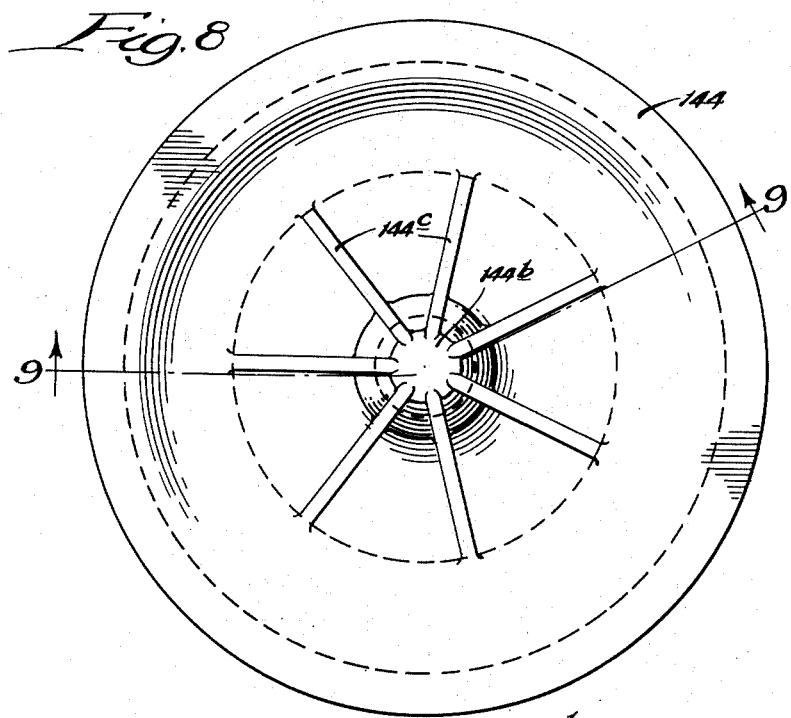
Figure 9:
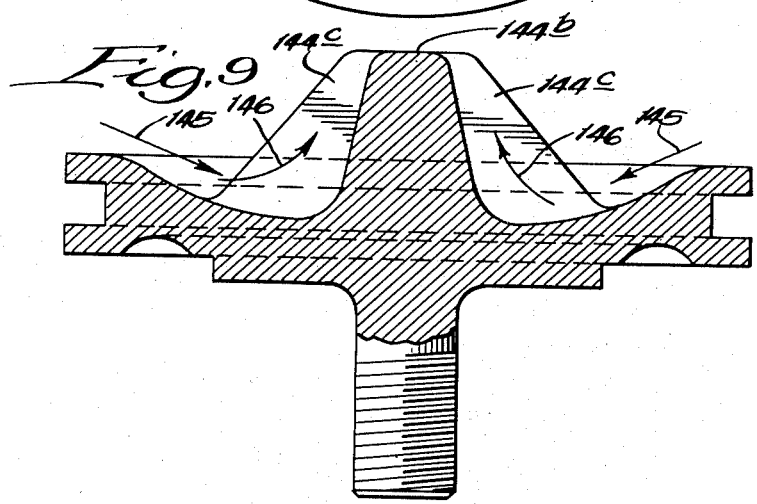

Figures 3, 4, and 5 are views like Figure 2 showing additional embodiments of the present invention;

Figure 6 is an axial cross-sectional view through the cylinder of a complete diesel engine constructed in accordance with the principles of an alternative embodiment of the present invention;

Figure 7 is a fragmentary view of the structure of Figure 6 showing the piston in the lowermost position where it uncovers both exhaust and intake ports;

Figure 8 is a top plan view of the crown portion of a piston constructed in accordance with still another embodiment of the present invention; and, Figure 9 is a cross-section view through axis 9—9, Figure 8.

Referring now to Figure 1, there is shown at 10 a cylinder block defined by a series of mating parts 10a to 10f sandwiched together and held in snug engagement by the bolts 12 having nuts 12a. The bolts 12 receive sleeves 14 between members 10b, 10c, and 10d to define intake and exhaust manifolds 16 and 18, respectively. A liner or sleeve 20 is received in the cylinder block 10 and fits snugly against the annular seat 22 formed in head 10f to define a closed cylinder.

The head portion 10f of the block 10 has a centrally symmetrical bore 24. In the specific embodiment shown, this bore is of conical shape and is stepped into the surrounding aluminum material. This bore is lined with a heat resisting material 26, such as stainless steel, having a value of thermal conductivity that does not produce excessive cooling which, together with the complementary part of the piston crown, defines a space of predetermined size and high wall temperature into which the fuel is injected. While the space so defined is of conical shape in the specific structure shown in Figure 1, other centrally symmetrical configurations, such as a sphere or half-sphere may be used and in some cases will operate more effectively.

A finned cylindrical member 28 surrounds the liner 20 in the region immediately below head 10f. This member reinforces the liner 20 and defines air passages 28a through which cylinder cooling air flow takes place.

A piston 30 is slidably received in the cylinder liner 20. The piston carries a wrist pin 32 which receives the connecting rod 34. The wrist pin 32 defines the inner member of a sleeve bearing whereas the connecting rod 34 forms the outer member thereof to permit rocking motions of the connecting rod as the piston reciprocates. The opposite end of the connecting rod has a semi-cylindrical sleeve bearing surface which is completed by the detachable complementary bearing defining member 34a which is attached to the connecting rod 34 by the bolts 36.

The sleeve bearing formed on the end of the connecting rod 34 receives the eccentric portion 38a of the crank shaft 38. Consequently, as the crank shaft 38 is rotated the piston 30 executes reciprocating motion. The counterbalance 40 balances the crank shaft 38 to reduce the vibratory forces incident to the unbalanced eccentric portion 38a of the crankshaft and the connecting rod 34.

It will be noted that the crankshaft 38 and the connecting rod 34 confine the piston 30 in the customary way to reciprocating movements having a predetermined throw. The maximum piston movement in the upward direction of Figure 1 brings the face of the piston almost in contact with the cylinder head 10f and the maximum movement of the piston in the downward direction just clears the intake ports 42 as is described in further detail hereafter. In general, it is desirable to have the piston clear the ports with a minimum overshoot, since this reduces the dead portion of the operating cycle when no work is being done. Moreover, as will be described in further detail hereafter, overshoot decreases the guiding effect of the piston face and thus detracts from the efficiency of scavenging.

The top face of the piston 30 is defined by the removable disk 44 which has a threaded stud portion 44a extending through the upper part of the piston. This stud receives the bolt 46 which securely holds the disk 44 in position on the piston. In the specific embodiment shown in Figure 1, the upper face of disk 44 is symmetrically cupped to define a low friction surface against which the air is directed. This structure is described in further detail hereafter.

The underside of the disk 44 is provided with an annular groove 44b which communicates with the edge of the cylinder through the annular passages 44c as shown. This structure is described and claimed in my copending patent application S. N. 160,886, filed May 9, 1950, entitled Internal Combustion Engine and Piston for Use Therewith. Briefly, it affords a heat barrier permitting the upper piston ring 48 and adjacent portions of the piston to operate well below the coking point of the fuel. It also defines a pressure relief space to reduce the pressure across the lower piston rings 50 in the event the upper ring 48 fails.

The fuel injector is indicated generally at 52. Briefly, fuel under pressure is supplied through injection tubing 54 to the fuel injector 52 which defines a passage closed by a valve and opening into the top of the symmetrical dome defined by lining 26. The fuel injector is actuated in sequence with the movements of piston 30 to force a metered quantity of fuel into the cylinder at essentially the time the piston reaches the maximum compression point shown in Figure 1.

Immediately above the cylinder head 10f, the fuel injector 52 has fins 52a. These fins are annular in shape and fit in a suitable bore in the longitudinal cylinder head fins 56. As the cooling air flows along the main fins 56 it flows into the space between each pair of adjacent fins 52a and around the injector to cool the same. This prevents clogging of the injector by the fuel. This structure is described and claimed in my copending patent application S. N. 182,276, filed August 30, 1950, entitled Internal Combustion Engine and Fuel Injector for Use Therewith.

In accordance with the present invention, the air is taken into the cylinder 20 and the exhaust gases withdrawn through two sets of symmetrically disposed ports axially spaced relative to the cylinder. The intake ports 42, Figures 1 and 2, communicate with the intake manifold 18 as shown and are directed in a primarily radial direction with a slight downward tilt in relation to the piston top face. The exhaust ports communicate with the exhaust manifold 16 and also have axial tilt as will be evident from Figures 1 and 2.

The orientation of the intake and exhaust ports about the periphery of the cylinder 20 is best seen in Figure 2a which is a cross-sectional view through axis 2a—2a, Figure 2. As shown, the ports are uniformly spaced about the liner 20 and the ports of each set are symmetrical relative to the cylinder. Moreover, as seen in the cross-section, the ports alternate so that each port 42 is between a pair of adjacent ports 58 and vice versa.

As will be evident from Figures 1, 2, and 2a the ports 42 are directed radially of the cylinder and have a slight downward tilt in relation to the piston top face. This causes the intake air to rush to the center of the cylinder when the ports are uncovered and thereafter to rise in a central column 60, Figure 2. This stream flows upwardly in the center of the cylinder until it strikes the head 10f where it is deflected downwardly and outwardly as shown by the arrows 62. The air stream then descends adjacent the walls of the cylinder in an annular downward flow 64 which is readily drawn into the exhaust passages 58 which have a substantial axial tilt in the upward direction and receive the downward flowing air without substantial change in direction of flow.

In the engine of Figures 1, 2, and 2a, it will be evident that the air flow takes place symmetrically relative to the axis of the cylinder. Moreover, the flow lines do not concentrate at any points other than the ports so that there is a minimum tendency for eddys and turbulence and a maximum tendency for separation between intake and exhaust air and minimum scavenging power requirements.

Moreover, the cool intake air stream is directed across the face of piston 30 so that it receives guidance therefrom.

One requirement essential to the creation of a central column of upwardly flowing intake air is that the air impinge upon and be guided by the face of the piston. Unless the intake air is so directed, it is likely to deviate from the central upward flow and flow directly into the exhaust ports or hug one portion of the cylinder wall. Either of these conditions results in passage of the intake air through the cylinder without effectively displacing the undesirable products of combustion from the prior stroke. While central flow can be enforced by exceedingly powerful intake jets created by ports whose area is small in comparison with the cylinder dimensions, this expedient demands high scavenging pressure with the incident power losses and reduced engine efficiency.

I have further found that the air flow can be practically directed across the face of the piston only by directing the air flow coming out of the intake ports to impinge upon the face of the piston from its outermost portions on and at at least a small angle relative thereto. An additional effect of this flow configuration is the cooling effect on the piston which permits operation at higher power outputs than would otherwise be possible within fixed limits of piston temperature.

The structure of Figures 1, 2, and 2a is subject to the disadvantage that the port space is limited by the portion of the cylinder at cross-section 2a where the ports 42 and 58 cross. This limits the maximum cross-sectional area of the ports and consequently increases the pressure differential required for scavenging. In the alternative structure of Figure 3, this problem is overcome by spacing the ports 58a and 42a a sufficient distance axially of the cylinder to avoid the crossed ports. Each set of ports can then be made of the maximum size permitted by the cylinder dimensions without regard to the other set.

As shown in Figure 3, the ports 58a and 42a are somewhat greater in number and larger in size than the ports 58 and 42, Figure 2. The available total port cross-sectional area is accordingly increased and the pressure and power required for scavenging flow accordingly reduced.

Figure 3 also shows a modified construction of the cap portion 44 of the piston 30. In the modified form shown in this view, the cap 44a has an upstanding air guiding protuberance 44b which deflects the air upwardly as it impinges thereon from the intake ports 42a. This protuberance supplements the action of the air streams issuing from the opposed ports in directing the air upwardly. The protuberance has the further advantage of defining a gradually curved space for air flow and overcoming any tendency for eddy flow at the center of the upper surface of the cap 44.

Figures 8 and 9 are top plan and cross-sectional views, respectively, of a piston cap or crown embodying a modified form of the piston structure of Figure 3. The piston crown in this case embodies a central protuberance 144b which guides the air in the same fashion as the protuberance 44b, Figure 3. However, a plurality of radial fins 144c extend about the protuberance as shown and extend outwardly from the protuberance by a distance substantially equal to its thickness.

The piston crown of Figures 8 and 9 may be attached to the piston of Figure 1 to define a complete engine. When the piston reaches the end of its downstroke, the intake ports 42, Figure 1, are uncovered to cause a series of jets spaced about the periphery of the piston to impinge upon the surface of the crown as shown by the arrows 145, Figure 9. These jets travel into the spaces between the adjacent fins and are deflected upwardly as shown by the arrows 146, Figure 9, to form a central column of upwardly flowing air. The fins guide the air stream in a purely non-circumferential direction with minimum tendency for eddy flow.

In Figure 4, the intake ports 42b are of rectangular cross-section and the exhaust ports 58b are of like cross-section. The advantage of this cross-section resides in the improved utilization of the available cylinder area in the region the oppositely directed ports overlap.

In the structure of Figure 5, the intake ports 42c and the exhaust ports 58c are oriented in the same direction, both being pointed towards the head of the cylinder. The ports do not cross, thus making the whole cylinder area available for each set of ports. The intake air is deflected downwardly against the piston face by a series of vanes mounted in each port 42c. These deflect the air just as it leaves each port to change the upward velocity component to a downward velocity component. This is shown by the arrows 68 which show the direction of air flow at various points in the ports.

It will be observed that in the structure of Figure 5 the number and size of the ports 42c and 58c is increased over the structures of Figures 2 and 4 and at the same time the spacing between the adjacent sets of ports is made smaller than in the structure of Figure 3. Consequently, ports of maximum size are achieved without a corresponding increase in the portion of the piston stroke during which the ports are uncovered.

Figures 6 and 7 show an engine constructed in accordance with a further embodiment of the present invention where the desired central air column is achieved with intake and exhaust ports oriented substantially parallel and yet the intake air impinges on the piston face without any air deflecting vanes. In Figures 6 and 7 parts corresponding to parts shown in Figure 1 are given like numbers except that 200 has been added to each.

The engine of Figure 6 is constructed generally like the engine of Figure 1 except that the additional sleeve 210g is sandwiched between the parts 210e and 210f. A cap 211 with fins 211a is fitted in the space thus defined between the part 210e which carries fins 228a and the cylinder head 210f. The cap 211 defines the conical outer portion of the cavity provided at the top of the cylinder to mate with and receive the crown portion 244 of the piston 230. In a production engine the cap 211 is preferably formed unitarily with the cylinder head 210f.

A precombustion chamber of somewhat spherical shape is defined in the cylinder of Figure 6 by the lining 226 formed in the cylinder head 210f. Fuel is injected into this chamber at approximately the point in the stroke shown in Figure 6.

The crown 244 of the piston 230 of Figure 6 is of conical shape with a flattened top portion 244a, Figure 6. The slope of this crown is slightly greater than the slope of the intake ports 242 as seen best in Figure 7. Consequently, as the intake air travels through the ports 242, it impinges on the crown 244 at a slight angle as indicated by the arrows 259, and is directed upwardly in a central air column as indicated by arrows 261. The air thereupon impinges on the cylinder head to be deflected outwardly and back as shown by the arrows 263 and then travels through the outlet ports 258 into the exhaust manifold 216 as shown by the arrows 265.

While air from the intake jets of the structure of Figures 6 and 7 impinges at a small angle against the piston face, the intake ports 242 are nevertheless oriented substantially parallel to the exhaust ports 258. Consequently the available cylinder area is effectively used for porting and the maximum port area available with the cylinder dimensions involved is achieved. Yet at the same time the axial distance between the openings of the respective groups of ports is minimized and the dead portion of the piston stroke thereby made small.

While square or rectangular ports may be used with the structure of Figures 6 and 7, round ports are most simple to form and, with the effective use of the cylinder size associated with the structure shown, have been found quite adequate in some engines.

It will be observed that in all the forms of the present invention the exhaust and intake ports are arranged in two symmetrical arrays near the bottom limit of the piston stroke. The ports opening into the cylinder at points adjacent the limit of piston throw are intake ports and direct the air in a direction fixed by the fact that it has no circumferential component and impinges on the piston top face at a slight angle either because of port orientation or because of air deflecting elements as shown in Figure 5. The other ports are exhaust ports adapted to receive exhaust gases flowing in a primarily axially downward direction by reason of their upward tilt. I have used the term "upward" herein to designate the direction away from the limit of piston throw near which the ports are located. By upward tilt of a port I mean that the opening of the port into the cylinder is positioned upwardly relative to the adjacent portions of the port.

While I have shown and described the present invention as applied to an air cooled diesel engine, it will be apparent that it is applicable to other internal combustion engines, such as gasoline engines, whether air cooled or water cooled.

In the accompanying claims I have referred to the ports 42c, Figure 5, as the trailing ports. These are behind ports 58c in the direction the ports are directed.

It will be observed that the exhaust ports are located above the intake ports so that the piston uncovers the exhaust ports before uncovering the intake ports. This provides a sufficient blow down to reduce the cylinder pressure below the pressure in the intake manifold before the intake ports are uncovered, thus avoiding counterflow without the necessity of valves.

While I have shown and described particular embodiments of my invention, it will of course be understood that I do not wish to be limited thereto and that by the appended claims I intend to cover all modifications and alternative constructions falling within the true spirit and scope of my invention.

What I claim as new and desire to secure by Letters Patent of the United States is:

1. In a two-cycle internal combustion engine the improvement comprising, a cylinder, a piston with a symmetrically dished face in the cylinder, means operative to confine the piston to reciprocating movements of predetermined throw, a plurality of intake ports arranged symmetrically about the cylinder adjacent one limit of piston throw and adapted to direct air in a non-circumferential downward direction against the piston face, and a plurality of exhaust ports arranged symmetrically about the cylinder adjacent the intake ports on the side opposite said limit of piston throw, the exhaust ports being adapted to receive air flowing in a primarily axially downward direction.

2. In a two-cycle internal combustion engine the improvement comprising a cylinder, a piston in the cylinder having a symmetrically dished face with a symmetrical centrally disposed flow-directing protuberance, means operative to confine the piston to reciprocating movements of predetermined throw, a plurality of intake ports arranged symmetrically about the cylinder adjacent one limit of piston throw and adapted to direct air in a non-circumferential direction against the face of the piston, and a plurality of exhaust ports arranged symmetrically about the cylinder adjacent the intake ports on the side opposite said limit of piston throw, the exhaust ports being adapted to receive air flowing in a primarily axially downward direction.

3. In a two-cycle internal combustion engine the improvement comprising a cylinder, a piston in the cylinder having a symmetrically dished face with a symmetrical centrally disposed flow-directing protuberance and radial vanes symmetrically disposed about the protuberance, means operative to confine the piston to reciprocating movements of predetermined throw, a plurality of intake ports arranged symmetrically about the cylinder adjacent one limit of piston throw and adapted to direct air in a non-circumferential direction against the face of the piston, and a plurality of exhaust ports arranged symmetrically about the cylinder adjacent the intake ports on the side opposite said limit of piston throw, the exhaust ports being adapted to receive air flowing in a primarily axially downward direction.

4. In a two-cycle internal combustion engine the improvement comprising a cylinder, a piston in the cylinder, means operative to confine the piston to reciprocating movements of predetermined throw, said cylinder having a plurality of symmetrical staggered intake and exhaust ports adjacent one limit of piston throw, the intake ports being directed towards said limit of piston throw and the exhaust ports being directed away from said limit of piston throw, the intake ports being disposed in a ring nearer said limit of piston throw than the exhaust ports and being oriented to direct the intake air against the face of the piston.

5. In a two-cycle internal combustion engine the improvement comprising a cylinder, a piston in the cylinder, means operative to confine the piston to reciprocating movements of predetermined throw, said cylinder having a plurality of symmetrical intake and exhaust ports adjacent one limit of piston throw, the intake ports being directed towards said limit of piston throw and the exhaust ports being directed away from said limit of piston throw, the intake ports being disposed in a ring nearer said limit of piston throw than the exhaust ports and being oriented to direct the intake air against the face of the piston.

6. In a two-cycle internal combustion engine the improvement comprising a cylinder, a piston in the cylinder, means operative to confine the piston to reciprocating movements of predetermined throw, said cylinder having a plurality of intake ports arranged symmetrically about the cylinder adjacent one limit of piston throw and oriented in non-circumferential directions away from said limit of piston throw, air deflecting vanes in said ports oriented to direct intake air against the face of the piston, and a plurality of exhaust ports arranged symmetrically about the cylinder adjacent the intake ports on the side opposite said limit of piston throw and oriented substantially parallel to the intake ports.

7. In a two-cycle internal combustion engine the improvement comprising a cylinder, a piston in the cylinder, having a conical face of predetermined slope, means operative to confine the piston to reciprocating movements of predetermined throw, said cylinder having a plurality of intake ports arranged symmetrically about the cylinder adjacent one limit of piston throw and oriented in non-circumferential directions away from said limit of piston throw at smaller slope than the slope of said face, and a plurality of exhaust ports arranged symmetrically about the cylinder adjacent the intake ports on the side opposite said limit of piston throw and oriented substantially parallel to the intake ports.

8. A cylinder structure for an internal combustion engine comprising a member with a cylindrical bore having an axis and two series of ports arranged symmetrically about the bore at adjacent axial position, one series of ports being oriented in a non-circumferential direction and the other series being oriented in a primarily axial direction pointed away from the first series of ports.

9. A cylinder structure for an internal combustion engine comprising a member with a cylindrical bore having an axis and two series of ports arranged symmetrically about the bore at adjacent axial positions, one series of ports being oriented in a non-circumferential direction with axial tilt away from the other series of ports and the other series of ports being oriented in a primarily axial direction away from the first series of ports.

10. A cylinder structure for an internal combustion engine comprising a member with a cylindrical bore having an axis and a series of ports alternately directed relative to the axis of the cylinder symmetrically disposed about the bore, the ports oriented in one direction opening at one axial point in the bore and the ports oriented in the other direction opening at an adjacent axial point in the bore.

11. A cylinder structure for an internal combustion engine comprising a member with a cylindrical bore having an axis and two series of ports symmetrically disposed about the cylinder at adjacent axial positions, the ports being oriented in like direction axially of the cylinder, and vanes in the trailing set of ports adapted to deflect air therein to a non-circumferential direction with small axial velocity component.

12. A cylinder structure for an internal combustion engine comprising a member with a cylindrical bore having an axis and two series of ports symmetrically disposed about the cylinder at adjacent axial positions, the ports being oriented in substantially parallel relation with substantial tilt in the axial direction.

13. In a port-controlled internal combustion engine characterized by efficient scavenging, the combination comprising a cylinder with a head at one end, a piston within the cylinder having a non-planar inner face, means to confine the piston to predetermined reciprocating motions toward and away from the head, the cylinder having a symmetrical set of intake ports located adjacent the outer limit of piston throw and operable in cooperation with the piston to create a central upward air column, and a symmetrical set of exhaust ports positioned inwardly of said intake ports and having primarily axially upward orientations to receive the descending annular column of air, said inlet ports being oriented to direct the incoming air against the inner face of said piston at an angle thereto, and said inner piston face having a non-planar, symmetrical configuration deflecting the streams of incoming air upwardly in a centrally symmetrical pattern within said cylinder.

ERNST W. SPANNHAKE.

References Cited in the file of this patent

UNITED STATES PATENTS

| Number | Name | Date |
|---|---|---|
| 856,647 | Maud | June 11, 1907 |
| 1,374,573 | Imhoff | Apr. 12, 1921 |
| 1,587,585 | Hansen | June 8, 1926 |
| 1,622,717 | Hildebrand | Mar. 29, 1927 |
| 1,727,697 | Bullnheimer | Sept. 10, 1929 |
| 1,781,194 | Riehm | Nov. 11, 1930 |
| 2,002,668 | Lack | May 28, 1935 |
| 2,016,344 | Simmen | Oct. 8, 1935 |
| 2,047,785 | Kreuzer | July 14, 1936 |
| 2,209,996 | Neuland | Aug. 6, 1940 |

FOREIGN PATENTS

| Number | Country | Date |
|---|---|---|
| 534,265 | France | of 1922 |